(12) United States Patent
Choi et al.

(10) Patent No.: US 11,562,545 B2
(45) Date of Patent: Jan. 24, 2023

(54) METHOD AND DEVICE FOR PROVIDING AUGMENTED REALITY, AND COMPUTER PROGRAM

(71) Applicant: LINE Corporation, Tokyo (JP)

(72) Inventors: Sang Jo Choi, Seoul (KR); Hee Cheol Park, Seoul (KR)

(73) Assignee: LINE CORPORATION, Toyko (JP)

( * ) Notice: Subject to any disclaimer, the term of this patent is extended or adjusted under 35 U.S.C. 154(b) by 0 days.

(21) Appl. No.: 17/395,083

(22) Filed: Aug. 5, 2021

(65) Prior Publication Data

US 2021/0366199 A1    Nov. 25, 2021

Related U.S. Application Data

(63) Continuation of application No. 16/508,830, filed on Jul. 11, 2019, now Pat. No. 11,120,629, which is a
(Continued)

(51) Int. Cl.
*G06T 19/00* (2011.01)
*G01P 15/18* (2013.01)
(Continued)

(52) U.S. Cl.
CPC .......... *G06T 19/006* (2013.01); *G01P 15/18* (2013.01); *G01S 7/4802* (2013.01); *G01S 17/08* (2013.01);
(Continued)

(58) Field of Classification Search
None
See application file for complete search history.

(56) References Cited

U.S. PATENT DOCUMENTS 8,884,986 B2   11/2014  Lee et al.
10,659,750 B2   5/2020  Meier et al.
(Continued)

FOREIGN PATENT DOCUMENTS

JP   H09-98323 A    4/1997
JP   2004-192653 A  7/2004
(Continued)

OTHER PUBLICATIONS

International Search Report (PCT/ISA/210) for International Application No. PCT/KR2017/002373 dated Dec. 5, 2017 and English translation thereof.

(Continued)

*Primary Examiner* — Jwalant Amin
(74) *Attorney, Agent, or Firm* — Harness, Dickey & Pierce, P.L.C.

(57) ABSTRACT

According to at least some example embodiments, a computer-readable medium stores computer-executable program instructions that, when executed by a processor, cause the processor to perform operations including, obtaining plane information of a plane by using first distances from a terminal to a plurality of points on the plane; obtaining a normal vector of the plane by using direction information of the terminal measured by a direction sensor and the plane information; determining, based on the normal vector, a parameter of an object to be displayed on the plane; and displaying, on a display of the terminal, the object according to the determined parameter.

18 Claims, 8 Drawing Sheets

Related U.S. Application Data continuation of application No. PCT/KR2017/002373, filed on Mar. 6, 2017.

(51) Int. Cl.

| | | |
|---|---|---|
| *G01S 17/08* | (2006.01) | |
| *G01S 17/42* | (2006.01) | |
| *G06F 3/0346* | (2013.01) | |
| *G06T 7/73* | (2017.01) | |
| *G01S 17/86* | (2020.01) | |
| *G06F 3/01* | (2006.01) | |
| *G01S 7/48* | (2006.01) | |
| *G01S 15/08* | (2006.01) | |

(52) U.S. Cl.
CPC .............. *G01S 17/42* (2013.01); *G01S 17/86* (2020.01); *G06F 3/011* (2013.01); *G06F 3/0346* (2013.01); *G06T 7/73* (2017.01); *G01S 15/08* (2013.01); *G06T 2219/008* (2013.01)

(56) References Cited

U.S. PATENT DOCUMENTS

| | | | |
|---|---|---|---|
| 2003/0206166 A1 | 11/2003 | Kamata et al. | |
| 2012/0019441 A1* | 1/2012 | Ueno | G03B 21/142 |
| | | | 345/156 |
| 2013/0265392 A1 | 10/2013 | Rhee et al. | |
| 2014/0168262 A1 | 6/2014 | Forutanpour et al. | |
| 2014/0168268 A1 | 6/2014 | Oi et al. | |
| 2015/0145985 A1 | 5/2015 | Gourlay et al. | |
| 2016/0055268 A1* | 2/2016 | Bell | G06T 17/00 |
| | | | 703/1 |
| 2016/0191877 A1 | 6/2016 | Ono | |
| 2016/0309127 A1 | 10/2016 | Narikawa et al. | |

FOREIGN PATENT DOCUMENTS

| | | |
|---|---|---|
| JP | 2013-512480 A | 4/2013 |
| JP | 2014-526099 A | 10/2014 |
| KR | 2013-0025200 A | 3/2013 |
| KR | 2014-0001167 A | 1/2014 |
| KR | 2014-0145217 A | 12/2014 |
| KR | 2017-0014451 A | 2/2017 |
| WO | WO-2013/027628 A1 | 2/2013 |

OTHER PUBLICATIONS

Extended European search report for corresponding European Patent Application No. 17899941.3 dated Oct. 1, 2020.
Japanese Office Action dated Apr. 13, 2021 issued in corresponding Japanese Appln. No. 2019-548040.
Notice of Allowance dated May 18, 2021, issued in corresponding U.S. Appl. No. 16/508,830.

* cited by examiner

ABSTRACT# METHOD AND DEVICE FOR PROVIDING AUGMENTED REALITY, AND COMPUTER PROGRAM

CROSS-REFERENCE TO RELATED APPLICATION(S)

This is a continuation of U.S. application Ser. No. 16/508,830, filed Jul. 11, 2019, which is a continuation of and claims priority to PCT/KR2017/002373, filed on Mar. 6, 2017, the disclosures of each of which are hereby incorporated by reference in their entirety.

BACKGROUND

1. Field

At least some example embodiments relate to an augmented reality providing method, apparatus, and computer program.

2. Related Art

Augmented reality (AR) is a field of virtual reality and is a computer graphic technique in which a virtual object or information is combined with a real environment to make it look like an object originally existed in the environment. AR is also referred to as mixed reality (MR) because a virtual world having additional information is combined with a real world in real time to be displayed as one image.

Existing virtual reality was targeted only at a virtual space and object. However, AR can reinforce and provide additional information that may be difficult to obtain only via the real world, by combining a virtual object on the basis of the real world.

SUMMARY

At least some example embodiments provide augmented reality for recognizing a plane and displaying a corresponding object on the plane. At least some example embodiments provide augmented reality for distinguishing an attribute of a plane according to directions of the plane and a terminal and displaying an object corresponding to the attribute of the plane.

According to at least some example embodiments, a computer-readable medium stores computer-executable program instructions that, when executed by a processor, cause the processor to perform operations including, obtaining plane information of a plane by using first distances from a terminal to a plurality of points on the plane; obtaining a normal vector of the plane by using direction information of the terminal measured by a direction sensor and the plane information; determining, based on the normal vector, a parameter of an object to be displayed on the plane; and displaying, on a display of the terminal, the object according to the determined parameter.

The operations further include measuring directions of the plurality of points and the first distances by using an infrared sensor, wherein the obtaining of the plane information includes obtaining the plane information by using the measured directions and first distances.

The plane information is direction information of the plane based on a direction of the terminal, the direction sensor includes at least one of an acceleration sensor and a gyro sensor, and the obtaining of the normal vector includes obtaining the normal vector by converting a reference of the direction information of the plane from the direction of the terminal to a reference direction of the direction sensor, based on the measured direction information of the terminal.

The determining includes determining an attribute of the plane based on the normal vector and determining the parameter based on the determined attribute.

The plane information is direction information of the plane, and the determining includes determining a first parameter of the object based on the attribute and determining a second parameter of the object based on the direction information of the plane.

The plane information may be direction information of the plane, the determining may include determining a type of the object based on the attribute and determining a rendering direction of the object based on the direction information of the plane, and the displaying may include two-dimensionally rendering 3-dimensional (3D) information for displaying the object, according to the rendering direction, and two-dimensionally displaying the object.

The displaying may include overlapping the object and a video captured by a camera provided in the terminal and displaying the video overlapped by the object.

The operations may further include measuring the first distances using a distance sensor provided in the terminal, and the camera and the distance sensor are provided towards a same direction.

The parameter may include at least one of a size of the object, direction of the object, color of the object, or an animation applied to the object.

According to at least some example embodiments, an augmented reality providing method includes obtaining plane information of a plane by using first distances from a terminal to a plurality of points on the plane; obtaining a normal vector of the plane by using the plane information and direction information of the terminal measured by a direction sensor; determining, based on the normal vector, a parameter of an object to be displayed on the plane; and displaying, on a display of the terminal, the object according to the determined parameter.

According to at least some example embodiments, an augmented reality providing apparatus includes a distance sensor; a direction sensor; and processing circuitry configured to, obtain plane information of a plane by using first distances measured by the distance sensor, the first distances being distances from a terminal to a plurality of points on the plane, obtain a normal vector of the plane by using direction information of the terminal measured by the direction sensor and the plane information, determine based on the normal vector, a parameter of an object to be displayed on the plane, and display, on a display of the terminal, the object according to the determined parameter.

The direction sensor may include at least one of an acceleration sensor or a gyro sensor, wherein the plane information is direction information of the plane based on a direction of the terminal, and wherein the processing circuitry is configured to obtain the normal vector by converting a reference of the direction information of the plane from the direction of the terminal to a reference direction of the direction sensor, based on the measured direction information of the terminal.

The processing circuitry may be configured to determine an attribute of the plane based on the normal vector and determine the parameter based on the determined attribute.

The plane information may be direction information of the plane, and the processing circuitry may be configured to determine a first parameter of the object based on the attribute and determine a second parameter of the object based on the direction information of the plane.

The plane information may be direction information of the plane, the processing circuitry may be configured to determine a type of the object based on the attribute and determine a rendering direction of the object based on the direction information of the plane, and the processing circuitry may be configured to two-dimensionally renders 3-dimensional (3D) information for displaying the object, according to the rendering direction, and two-dimensionally displays 3-dimensional (3D) information for displaying the object.

The processing circuitry may be configured to overlap the object and a video captured by a camera provided in the terminal and display the video overlapped by the object.

The augmented reality providing apparatus may further include the camera, wherein the camera and the distance sensor are provided towards a same direction.

The processing circuitry may be configured such that the parameter includes at least one of a size of the object, direction of the object, color of the object, or an animation applied to the object.

Other aspects, features, and advantages will become apparent from the following drawings, claims, and detailed description of the disclosure. These general and specific embodiments may be implemented by using a system, a method, a computer program, or a combination of the system, the method, and the computer program.

An augmented reality providing method, apparatus, and computer program according to at least some example embodiments enable a user to visually/intuitively recognize, through a virtual object, even an attribute of a plane which is difficult to identify only by an image, by distinguishing the attribute of the plane according to directions of the plane and a terminal and displaying an object corresponding to the attribute of the plane.

An augmented reality providing method, apparatus, and computer program according to at least some example embodiments selectively provide an object related to an attribute of a plane, and thus, a virtual object closely related to reality can be displayed and more realistic augmented reality is provided. Also, the augmented reality providing method, apparatus, and computer program are applicable to a service that needs to provide different objects according to the attribute of the plane.

BRIEF DESCRIPTION OF DRAWINGS

The above and other features and advantages of example embodiments of the inventive concepts will become more apparent by describing in detail example embodiments of the inventive concepts with reference to the attached drawings. The accompanying drawings are intended to depict example embodiments and should not be interpreted to limit the intended scope of the claims. The accompanying drawings are not to be considered as drawn to scale unless explicitly noted.

DETAILED DESCRIPTION

Figure 1:
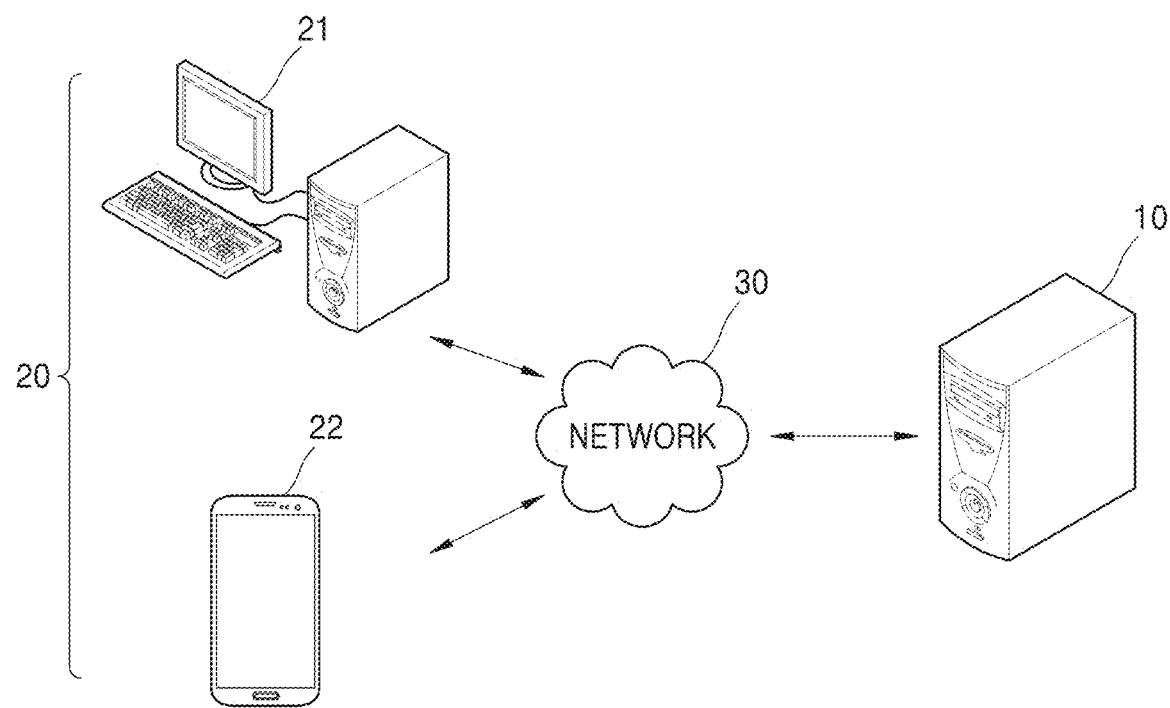
FIG. 1 is a diagram showing a configuration of an augmented reality providing system according to at least one example embodiment of the present disclosure.

As the present disclosure allows for various changes and numerous embodiments, particular embodiments will be illustrated in the drawings and described in detail in the written description. Effects and features of the present disclosure, and methods of achieving them will become apparent with reference to the embodiments described in detail below together with the drawings. However, the present disclosure is not limited to the embodiments described below, but may be implemented in various forms.

Hereinafter, at least some example embodiments will be described in detail with reference to accompanying drawings, wherein like reference numerals refer to like or corresponding components throughout the drawings, and redundant descriptions thereof will be omitted.

While such terms as "first", "second", etc., may be used to describe various components, such components must not be limited to the above terms. The above terms are used only to distinguish one component from another. An expression used in the singular encompasses the expression of the plural, unless it has a clearly different meaning in the context. In the present specification, it is to be understood that the terms such as "including" or "having," etc., are intended to indicate the existence of the features or components, and are not intended to preclude the possibility that one or more other features or components may exist or may be added. In drawings, for convenience of description, sizes of components may be exaggerated for clarity. For example, since sizes and thicknesses of components in drawings are arbitrarily shown for convenience of description, the sizes and thicknesses are not limited thereto.

FIG. 1 is a diagram showing a configuration of an augmented reality (AR) providing system according to at least one example embodiment of the present disclosure.

Referring to FIG. 1, the AR providing system according to at least one example embodiment of the present disclosure includes a server 10, a user terminal 20, and a network 30 connecting the server 10 to the user terminal 20.

The AR providing system provided according to at least one example embodiment of the present disclosure provides AR, in which an object is displayed in real-time while overlapping an image captured by a camera. In particular, in the AR provided according to at least one example embodiment, a plane that is actually present around the user terminal 20 is recognized, an attribute of the recognized plane is determined, and a virtual object is displayed in real-time accordingly together with the image captured by the camera.

According to at least some example embodiments, the server 10 provides a program for providing AR to the user terminal 20. The user terminal 20 may receive and install the program from the server 10, and provide AR to a user by using the installed program.

The user terminal 20 may be any terminal in which an AR providing program provided according to at least one example embodiment of the present disclosure is installable. The user terminal 20 may be a portable terminal. In FIG. 1, the portable terminal is illustrated as a smart phone, but the aspect of the present disclosure is not limited thereto, and as described above, a terminal in which a computer program is installable may be unlimitedly employed. For example, the user terminal 20 includes a wearable computer, a head-mounted display (HMD), or the like.

The user terminal 20 includes a display unit for displaying a screen and a camera for capturing images. The display unit, which may also be referred to in the present disclosure as a "display," may be or include a display panel for displaying the image directly. However, according to at least some example embodiments, the display is not limited to being or including a display panel. For example, the display may be or include a projecting-type display device. The user terminal 20 may further include a distance sensor and a direction sensor.

The network 30 connects the user terminal 20 to the server 10. For example, the network 30 provides a connection path such that the user terminal 20 accesses the server 10 to exchange packet data.

Although not illustrated, the server 10 according to at least one example embodiment of the present disclosure may include a memory, an input/output unit, a program storage unit, a control unit, and the like.

Figure 2:
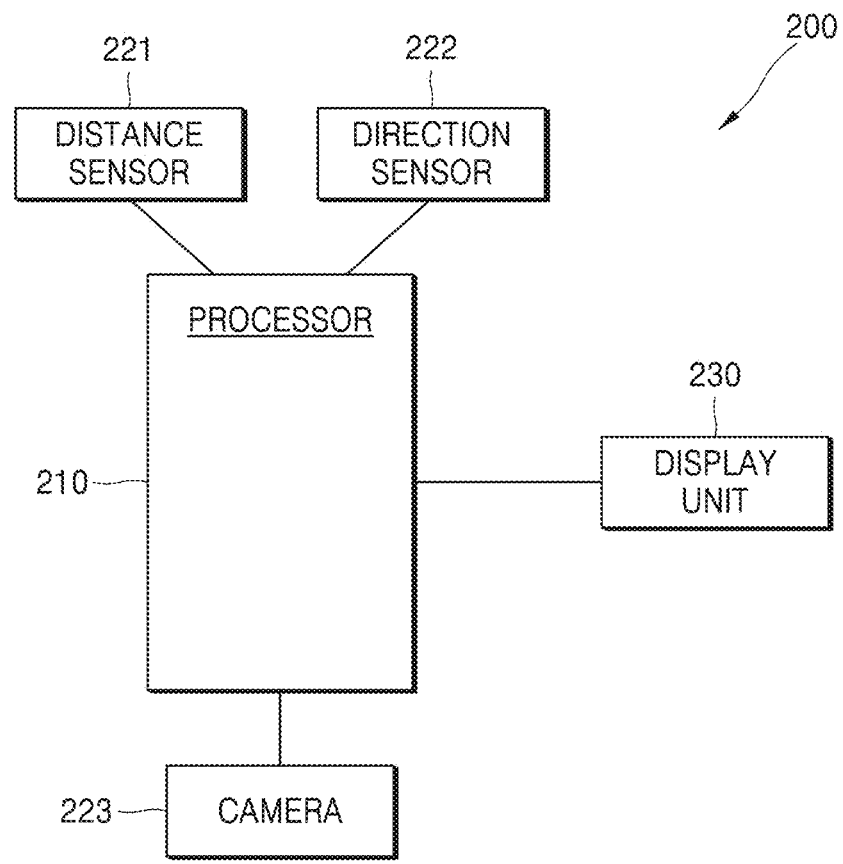
FIG. 2 is a diagram showing a configuration of an augmented reality providing apparatus according to at least one example embodiment of the present disclosure.

FIG. 2 is a diagram showing a configuration of an AR providing apparatus 200 according to at least one example embodiment of the present disclosure.

The AR providing apparatus 200 according to at least one example embodiment of the present disclosure may be any type of apparatus including a processor for processing data. For example, the AR providing apparatus 200 may include at least one processor. Here, the 'processor' may denote a data processing apparatus embedded in hardware and having a physically structured circuit for performing a function expressed in code or a command in a program. Examples of the data processing apparatus embedded in hardware as such may include processing apparatuses, such as a microprocessor, a central processing unit (CPU), a processor core, a multiprocessor, an application-specific integrated circuit (ASIC), and a field programmable gate array (FPGA), but the scope of the present disclosure is not limited thereto. Accordingly, the AR providing apparatus 200 may be embodied by another hardware apparatus, such as a microprocessor or a general-purpose computer system executing computer-executable program code corresponding to the operations of the AR providing apparatus 200. Processors executing program code are programmed processors, and thus, are special-purpose computers. The AR providing apparatus 200 may be mounted on the user terminal 20 of FIG. 1.

Only components related to the current embodiment are shown in the AR providing apparatus 200 of FIG. 2 to prevent features of the current embodiment from being blurred. Thus, it will be understood by one of ordinary skill in the art that other general-purpose components may be further included in addition to the components shown in FIG. 2.

For example, the AR providing apparatus 200 may further include a communication unit including hardware and software required to transmit and receive signals to and from another network apparatus (for example, the server 10), via wired or wireless connection.

Also, the AR providing apparatus 200 may further include a memory performing a function of temporarily or permanently storing data processed by the AR providing apparatus 200. The memory may include a magnetic storage medium or a flash storage medium, but the scope of the present disclosure is not limited thereto.

The AR providing apparatus 200 according to at least one example embodiment of the present disclosure recognizes a plane according to a measurement value of a distance sensor 221, determines an attribute of the plane by using a measurement value of a direction sensor 222, and displays a virtual object in real-time accordingly, on a display unit 230, together with an image captured by a camera 223, by using processing circuitry 210 such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a programmable logic unit, a microprocessor, application-specific integrated circuit (ASIC), etc. For the purpose of simplicity, the processing circuitry 210 is illustrated in FIG. 2 as a processor configured to execute software (i.e., processor 210). However, as is noted above, the processing circuitry 210 is not limited to a processor executing software, and may also be embodied by hardware including logic circuits, or hardware including logic circuits in combination with a processor executing software.

Referring to FIG. 2, the AR providing apparatus 200 according to at least one example embodiment of the present disclosure includes the processing circuitry 210, the distance sensor 221, the direction sensor 222, the camera 223, and the display unit 230.

The distance sensor 221 obtains distances from the distance sensor 221 to a plurality of points in front. The distance sensor 221 further obtains direction information to the plurality of points. When the plane is present in front, the distance sensor 221 may obtain the distances to and directions of the plurality of points on the plane, and the processing circuitry 210 may obtain plane information including the plurality of points, for example, a plane equation, a plane vector, and the like, as information for defining the plane, by using information measured by the distance sensor 221.

The distance sensor 221 may be an infrared sensor and may measure the distances from the infrared sensor to the plurality of points. The infrared sensor emits infrared light and then receives the reflected infrared light to measure a distance to a point where the infrared light is reflected. The distance sensor 221 may be an ultrasonic sensor. The ultrasonic sensor emits ultrasonic waves and then receives the reflected ultrasonic waves to measure a distance to a point where the ultrasonic waves are reflected.

According to at least one example embodiment, the distance sensor 221 includes an emitting unit emitting the infrared light and a receiving unit receiving the reflected infrared light. According to at least one example embodiment, the distance sensor 221 may measure a distance to a first point positioned in a first direction from the distance sensor 221 by emitting infrared light in the first direction and then receiving the reflected infrared light, and measure a distance to a second point positioned in a second direction from the distance sensor 221 by emitting infrared light in the second direction and then receiving the reflected infrared light. The distance sensor 221 may measure the distances to the plurality of points by repeating such processes.

A direction in which the distance sensor 221 emits infrared light may be variously set according to a pre-set condition. The distance sensor 221 may include one emitting unit capable of adjusting an emitting direction or may include a plurality of emitting units.

The direction sensor 222 measures a direction the user terminal 20 faces. The direction sensor 222 may be, for example, an acceleration sensor, an angular speed sensor, a geomagnetic field sensor, or a combination thereof. The direction sensor 222 may recognize a gravity direction to measure a direction a terminal faces based on the gravity direction. However, the gravity direction is an example of a reference direction, and thus the direction is not limited thereto.

The camera 223 captures an image. The display unit 230 includes a display panel and displays an image according to control of the processing circuitry 210.

According to at least one example embodiment of the present disclosure, the camera 223 and the distance sensor 221 are provided towards a same direction. Accordingly, it is easy to associate the image captured by the camera 223 and information obtained by the distance sensor 221 and easy to provide AR in which an object generated based on the information obtained by the distance sensor 221 is displayed while overlapping the image captured by the camera 223.

When the camera 223 and the distance sensor 221 are provided facing different directions, an additional operation of converting the information obtained by the distance sensor 221 based on a provided direction of the camera 223 may be required.

Figure 3:
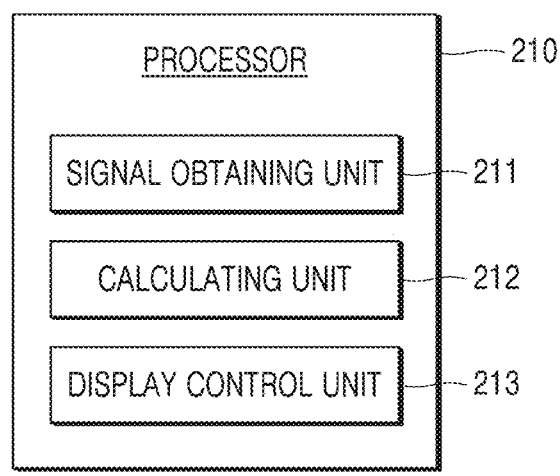
FIG. 3 is a block diagram showing a configuration of a processor shown in FIG. 2.

FIG. 3 is a block diagram showing a configuration of the processing circuitry 210 shown in FIG. 2.

Referring to FIG. 3, the processing circuitry 210 includes a signal obtaining unit 211, a calculating unit 212, and a display control unit 213. Blocks included in the processing circuitry 210 of FIG. 3 may all be realized on one processor and distinguished according to functions, but are not limited thereto, and may be realized on individual processors. Also, the functions of the blocks may be integrally realized through one program code, or may be prepared in individual program codes, and the program codes may interwork such that the processing circuitry 210 of FIG. 3 and the AR providing apparatus 200 of FIG. 2 provide AR. For example, according to at least some example embodiments, the signal obtaining unit 211, calculating unit 212, and display control unit 213 may be embodied by a processor of the AR providing apparatus 200 (e.g., the processing circuitry 210) executing computer-executable program instructions that are stored in memory of the AR providing apparatus 200 and correspond to operations of the signal obtaining unit 211, calculating unit 212, and display control unit 213.

Hereinafter, at least some example embodiments will be described with reference to FIGS. 2 and 3 together.

The signal obtaining unit 211 according to at least one example embodiment obtains signals from the distance sensor 221, the direction sensor 222, and the camera 223.

The calculating unit 212 according to at least one example embodiment processes a signal obtained by the signal obtaining unit 211. For example, the signal obtaining unit 211 obtains distances to a plurality of points from the distance sensor 221 and the calculating unit 212 obtains plane information of a plane including the plurality of points by using the obtained distances. The plane information is direction information of the plane based on a direction where the distance sensor 221 is provided, and may be expressed in a form of a plane equation, a plane vector, or the like. The plane information may be obtained, for example, from the plurality of points by using a random sample consensus (RANSAC) technique, but an embodiment is not limited thereto.

According to at least one example embodiment, the calculating unit 212 obtains the plane information of the plane including some points by using the distances to the some points, among the distances to the plurality of points obtained by the signal obtaining unit 211. For example, when a difference between a distance to a first point and a distance to a second point is large despite the similarity of directions of the first and second points, it is highly likely that the first point and the second point are present on different planes. When directions of the second point and a third point are similar and a difference between the distance to the second point and a distance to the third point is small, it is highly likely that the second point and the third point are present on a same plane. Accordingly, among the plurality of points, the calculating unit 212 may extract some points having similar distances from the distance sensor 221 and obtain the plane information by using the distances to the extracted some points. For example, when a difference between distances to three or more points among the plurality of points is lower than a pre-set threshold value, the calculating unit 212 obtains the plane information by using the distances to the three or more points. For example, when the differences between the distances to the first point, the second point, and the third point are all lower than the pre-set threshold value, the plane information of the plane including the first through third points is obtained.

The signal obtaining unit 211 obtains direction information of a terminal measured by the direction sensor 222, and the calculating unit 212 obtains a normal vector of the plane by using the pre-obtained plane information and the direction information of the terminal. In particular, the calculating unit 212 converts a reference direction of the plane information from a direction of the terminal (or a direction in which the distance sensor 221 provided in the terminal faces) to a reference direction of the direction sensor 222. In particular, the calculating unit 212 finally obtains direction information of the plane based on the direction of gravity by moving the direction information of the plane obtained based on the direction of the terminal by the direction information (based on the direction of gravity recognized by an acceleration sensor) of the terminal measured by the direction sensor 222. The direction information of the plane based on the direction of gravity obtained as such may be the normal vector of the plane.

The calculating unit 212 determines a parameter of an object to be displayed on the plane, considering the normal vector of the plane. The object may include a plurality of parameters. Examples of the parameter include a color, inclination, category, type, and direction of the object, and an animation applied to the object. For example, the calculating unit 212 may set the inclination of the object to correspond to a direction of the normal vector of the plane.

The calculating unit 212 may distinguish an attribute of the plane considering the normal vector of the plane. Also, the calculating unit 212 may determine the parameter of the object considering the attribute of the plane. The attribute of the plane is, for example, a type of the plane, and may be distinguished into the floor, wall, and ceiling. The calculating unit 212 may differently determine the parameter of the object based on whether the plane is the floor, wall, or ceiling. For example, when the plane is the wall, the calculating unit 212 may set an animation parameter in which the object moves along a path of breaking through the plane. When the plane is the floor, the calculating unit 212 may set an animation parameter of moving on the floor in parallel with the floor.

The calculating unit 212 may determine the parameter of the object considering each of the direction information (based on the direction of the terminal) of the plane and the attribute of the plane determined according to the normal vector of the plane. For example, the calculating unit 212 may determine a first parameter of the object according to the attribute of the plane and determine a second parameter of the object according to the normal vector of the plane. For example, the calculating unit 212 may determine the color of the object according to the attribute of the plane and determine the inclination of the object according to the direction of the plane. When the object is an icon, the calculating unit 212 may differently determine a color of the icon according to the type of the plane and determine an inclination of the icon according to the direction of the plane. The inclination may be an inclination for two-dimensionally rendering and displaying 3-dimensional (3D) icon display information or may be an aspect ratio of the icon.

AR according to at least one example embodiment of the present disclosure may provide furniture arrangement simulation. The object may be furniture. In this case, the calculating unit 212 may determine the type of the object according to the attribute of the plane and determine the rendering direction of the object according to the direction of the plane. For example, when the attribute of the plane is "floor", the calculating unit 212 may determine the type of the object to be furniture arrangeable on the floor, such as a table, a chair, a couch, or a bed, and determine a display direction of the object according to the direction of the plane. The display direction of the object may for two-dimensionally rendering and displaying 3D furniture display information, but is not limited thereto, and may be for rotating and/or scaling 2D furniture display information.

The signal obtaining unit 211 according to at least one example embodiment of the present disclosure obtains an image from the camera 223 and the display control unit 213 displays the obtained image on the display unit 230. The calculating unit 212 may further use the image obtained by the signal obtaining unit 211 to determine the parameter of the object. For example, the calculating unit 212 may determine texture of the plane by analyzing the image captured by the camera 223. The calculating unit 212 may extract colors of the plurality of points recognized by the distance sensor 221 from the image obtained from the camera 223, determine a color of the plane by using information of the extracted colors, and determine the texture of the plane. The calculating unit 212 may determine the parameter of the object by using the information of the extracted colors. The calculating unit 212 may determine the parameter of the object according to the color or texture of the plane. For example, the animation of the object may be determined according to the texture of the plane. For example, when the texture of the plane is smooth, an animation in which the object slides may be set. The calculating unit 212 may determine the color of the object according to the color of the plane. The calculating unit 212 may classify a concept of an entire space considering colors of a plurality of planes included in the space and select an object corresponding to the classified concept.

The display control unit 213 according to at least one example embodiment displays the image captured by the camera 223 included in the user terminal 20 on the display unit 230 in real-time. The display control unit 213 may provide AR by overlapping and displaying the object and the image captured by the camera 223. The display control unit 213 overlaps and displays the object on a region of the image captured by the camera 223, which corresponds to the plane recognized by the calculating unit 212. When the camera 223 and the distance sensor 221 are provided towards a same direction, the distance sensor 221 recognizes a plane captured by the camera 223. Accordingly, the display control unit 213 may provide AR by displaying the plane captured by the camera 223 while also displaying the object according to the parameter of the object determined based on the information of the plane obtained based on a measurement value of the distance sensor 221.

The object corresponds to 2D or 3D image, a static/dynamic icon, or the like, and includes values of a plurality of parameters. The parameter of the object is set according to the plane information, and thus, the object may be differently displayed based on the plane information. The display control unit 213 displays the object by referring to the parameter of the object. The display control unit 213 may two-dimensionally render 3D information for displaying the object according to a rendering direction, based on a rendering direction parameter of the object, and display the rendered 3D information on the display unit 230.

According to at least one example embodiment, the calculating unit 212 may determine the object to be displayed on the plane of which the attribute is "wall" to be a "mirror". In this case, the display control unit 213 may display a mirror object on the plane and display an image captured by a front camera inside the mirror object in real-time.

When the parameter of the object includes an animation, the display control unit 213 displays the object by applying the animation. For example, when the object in which an animation of breaking through a wall is displayed on the plane of which the attribute is "wall", the display control unit 213 may display the animation in which the object looks as if it breaks through the plane by overlapping an opaque layer on the plane with respect to the object and moving the object from the back of the virtual layer to the front. The virtual layer may be transparently set with respect displays other than the object.

According to at least one example embodiment, the calculating unit 212 may set the object of displaying the sun, moon, or star on the plane of which the attribute is "ceiling". According to at least one example embodiment, the calculating unit 212 may set the object moving between a plurality of planes. For example, a water drop object moving from the plane of which the attribute is "ceiling" to the plane of which the attribute is "floor" may be set. The water drop object may include an animation of scattering in a same direction as the plane when reaching the plane of which the attribute is "floor".

Figure 4:
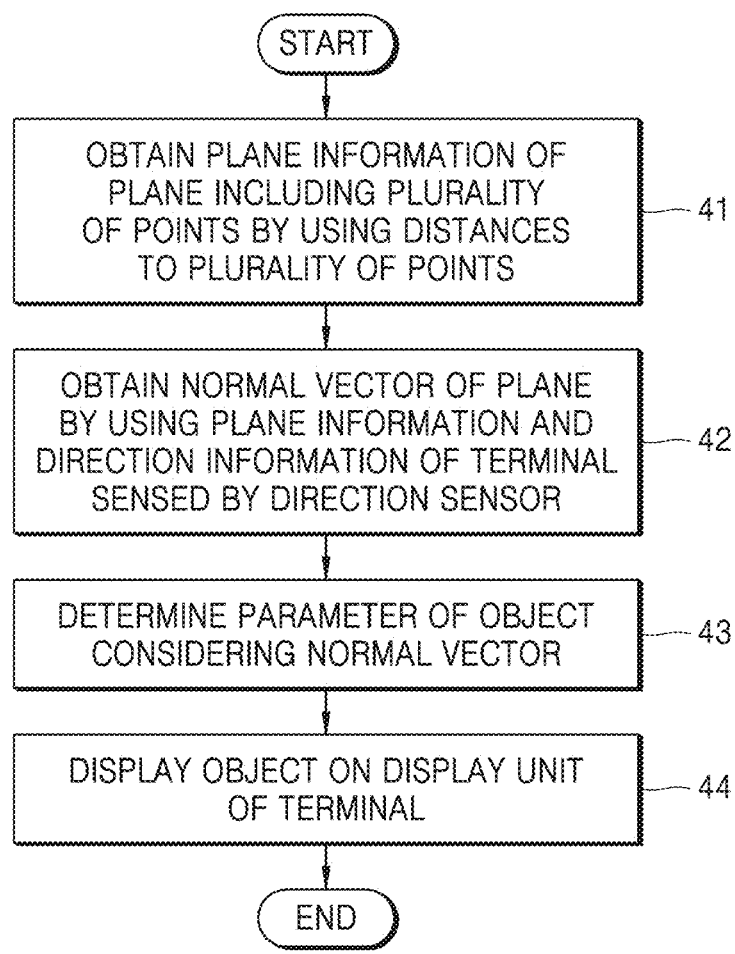
FIG. 4 is a flowchart of an augmented reality providing method according to at least one example embodiment of the present disclosure.

FIG. 4 is a flowchart of an AR providing method according to at least one example embodiment of the present disclosure.

The flowchart of FIG. 4 includes operations processed in time-series by the processing circuitry 210 of FIGS. 2 and 3. Accordingly, details described above in relation to components of FIGS. 2 and 2 will be applied to the flowchart of FIG. 4 even if omitted.

Referring to FIG. 4, in operation S41, the calculating unit 212 obtains the plane information of the plane including the plurality of points by using the distances to the plurality of points. The calculating unit 212 may further use the directions of the plurality of points.

In operation S42, the calculating unit 212 obtains the normal vector of the plane by using the plane information obtained in step S41 and the direction information of the terminal measured by the direction sensor 222.

In operation S43, the calculating unit 212 determines the parameter of the object considering the normal vector of the plane.

In operation S44, the display control unit 213 displays the object on the display unit 230 of the terminal.

Thus, according to at least some example embodiments, the processing circuitry 210 may obtain plane information of a plane by using distances from a terminal to a plurality of points on the plane; obtain a normal vector of the plane by using the plane information and direction information of the terminal measured by a direction sensor; determine, based on the normal vector, a parameter of an object to be displayed on the plane; and display, on a display of the terminal, the object according to the determined parameter.

Figure 5:
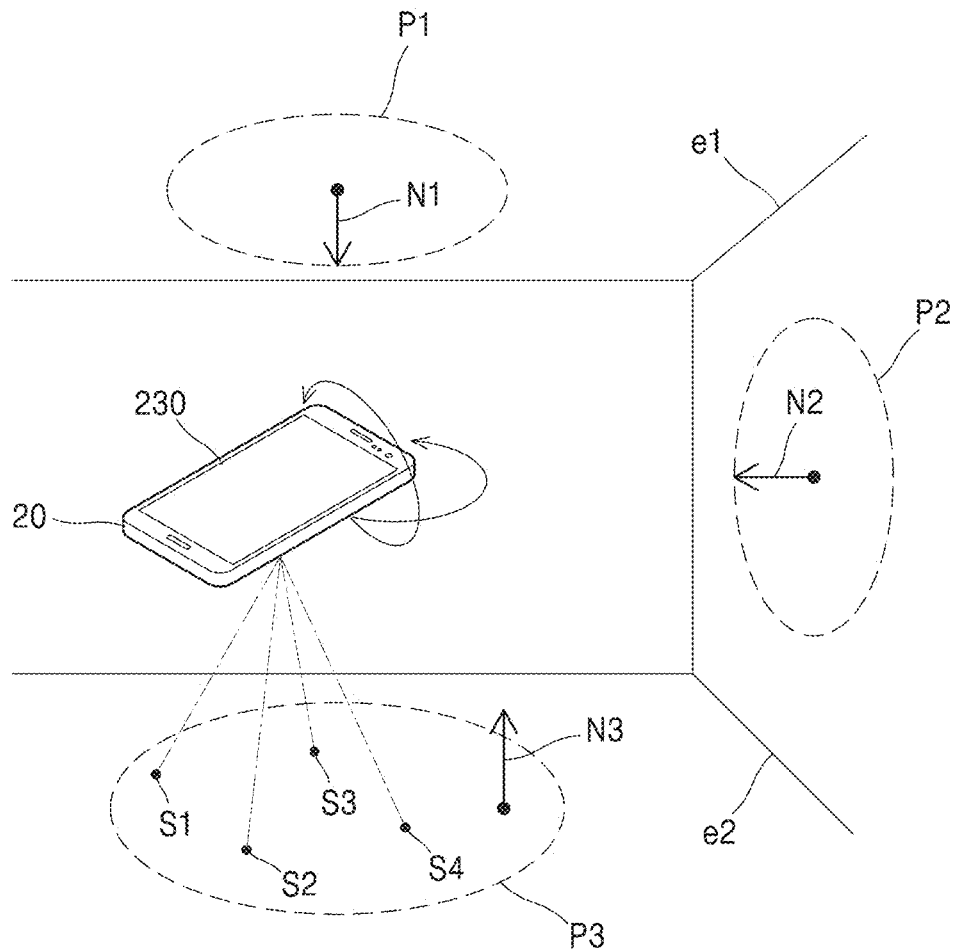
FIG. 5 is a diagram for describing a method, performed by the augmented reality providing apparatus of FIG. 2, of recognizing a plane.

FIG. 5 is a diagram for describing a method, performed by the AR providing apparatus 200 of FIG. 2, of recognizing a plane.

Referring to FIG. 5, the user terminal 20 is provided on a 3-dimensional (3D) space and a method in which and the 3D space is recognized by the AR providing apparatus 200 provided in the user terminal 20 is illustrated. While the user terminal 20 freely changes a direction, the AR providing apparatus 200 provided in the user terminal 20 may recognize a plurality of planes and recognize a space including the plurality of planes. FIG. 5 illustrates a first plane P1, a second plane P2, and a third plane P3.

First, an embodiment in which the AR providing apparatus 200 recognizes the third plane P3 while the user terminal 20 faces the floor will be described. When the user terminal 20 faces the floor, a distance sensor provided at a rear surface of the user terminal 20 measures distances to and directions of a plurality of points S1 through S4. The AR providing apparatus 200 combines information of the distances to and directions of the plurality of points S1 through S4 to define the third plane P3 including all of the plurality of points S1 through S4 and obtain direction information of the third plane P3. The direction information may be expressed in a plane equation or a plane vector, but is not limited thereto, and may be any information capable of defining a plane on a space.

Meanwhile, the direction information of the third plane P3 obtained based on the information of the distances to and directions of the plurality of points S1 through S4 measured based on the user terminal 20 is based on a direction in which the user terminal 20 faces. Accordingly, when the direction information of the third plane P3 is converted considering ground surface-based terminal direction information measured by a direction sensor provided in the user terminal 20, a third normal vector N3 with respect to the third plane P3 based on a ground surface may be obtained. In particular, a value of the third normal vector N3 of the third plane P3 based on the ground surface (or a gravity direction) may be obtained by adding direction information of the user terminal 20 based on the ground surface (or the gravity direction) to direction information of the third plane P3 based on a direction of the user terminal 20. The direction sensor may be an acceleration sensor recognizing gravitational acceleration, but is not limited thereto, and may be a 3-axis, 6-axis, or 9-axis sensor in which one or more of the acceleration sensor and a gyro sensor are combined.

A first normal vector N1 with respect to the first plane P1 and a second normal vector N2 with respect to the second plane P2 may be further obtained by changing the direction of the user terminal 20 in the same method described above.

The calculating unit 212 of the AR providing apparatus 200 determines an attribute of each plane according to a normal vector of each plane. For example, vectors of a floor and ceiling and a vector of a floor may be pre-stored in the user terminal 20.

For example, vector ranges of the floor and the ceiling may be −5° to 5° and/or 175° to 185°, and a vector range of the wall may be 85° to 95° and/or 265° to 275°. According to the example shown in FIG. 5, the first normal vector N1 and the third normal vector N3 correspond to the vector ranges of the floor and ceiling, and the second normal vector N2 corresponds to the vector range of the wall. Accordingly, the AR providing apparatus 200 determines an attribute of the first plane P1 or third plane P3 as the floor or the ceiling, and an attribute of the second plane P2 as the wall.

Alternatively, the vectors of the floor and the ceiling may each be defined as 0° or 180°, and the vector of the wall may be defined as 90° or 270°. When a normal vector of a plane is the same as the vectors of the floor and the ceiling within an error range among pre-defined vectors, the calculating unit 212 may define the attribute of the plane as the "floor or ceiling", and when the normal vector of the plane is the same as the vector of the wall within the error range, the calculating unit 212 may determine the attribute of the plane as the "wall".

The calculating unit 212 may perform a vector inner product calculation to calculate similarity between a normal vector of a plane and a vector of a pre-set specific attribute so as to determine an attribute of the plane. As such, by calculating an inner product value of the vector instead of calculating a distance between vectors to be used to measure similarity, a calculation time may be remarkably reduced. The inner product value approaches 1 or −1 when the vectors are similar. For example, when an absolute value of an inner product of the second normal vector N2 of the second plane P2 and a pre-set vector of a "wall" attribute is within a pre-set error range at 1 to −1, the calculating unit 212 determines the attribute of the second plane P2 as the "wall".

The AR providing apparatus 200 may consider height information of each plane or the direction information of the user terminal 20 to determine each of the attributes of the first plane P1 and the third plane P3 to be one of the floor and the ceiling. For example, the ceiling and the floor may be distinguished by comparing a height of the user terminal 20 and the height information of each plane distinguished according to the direction information of each plane and the direction information of the user terminal 20. For example, the attribute of the first plane P1 of which the height is higher than the user terminal 20 is determined to be the ceiling, and the attribute of the third plane P3 of which the height is lower than the user terminal 20 is determined to be the floor. Alternatively, the attribute of the first plane P1, in which the direction of the user terminal 20 is 90° or greater at a point in time when the first plane P1 is recognized, is determined as the ceiling, and the attribute of the third plane P3, in which the direction of the user terminal 20 is less than 90° at a point in time when the third plane P3 is recognized, is determined as the floor.

Referring to FIG. 5, the AR providing apparatus 200 may recognize a cross line of planes as an edge, i.e., a border of each plane. For example, the AR providing apparatus 200 recognizes a cross line e1 of the first plane P1 and the second plane P2 as the edge of the first plane P1 and the second plane P2 by referring to the first and second normal vectors N1 and N2 of the first plane P1 and the second plane P2 of FIG. 5. Also, the AR providing apparatus 200 may recognize a cross line e2 of the second plane P2 and the third plane P3 as the edge of the second plane P2 and the third plane P3 by referring to the second and third normal vectors N2 and N3 of the second plane P2 and the third plane P3. The AR providing apparatus 200 may recognize the 3D space by using the first through third normal vectors N1 through N3.

When recognized planes are all surrounded by edges, the AR providing apparatus 200 may recognize a closed space. In order to complete the closed space, the AR providing apparatus 200 may induce a photographing direction of the user terminal 20 by using a game element. For example, when there is a plane not surrounded by an edge, the AR providing apparatus 200 may display, on the display unit 230 of the user terminal 20, an arrow or the like indicating a portion of the plane, which is not surrounded by an edge, or may apply an animation of moving a character displayed on the display unit 230 of the user terminal 20 to the portion not surrounded by an edge.

When a plane that is not recognized is being photographed, the AR providing apparatus 200 may display a time-consuming game element at a corresponding direction such that a user continuously photographs the direction. The AR providing apparatus 200 recognizes a surrounding space while the user proceeds with the game element.

The AR providing apparatus 200 may display an object on a plane. For example, a character moving on the third plane P3 recognized as the floor may be displayed. The AR providing apparatus 200 may set the character to move along a path between the plurality of points S1 through S4 recognized by the distance sensor, when the character moves on the third plane P3.

Figure 6:
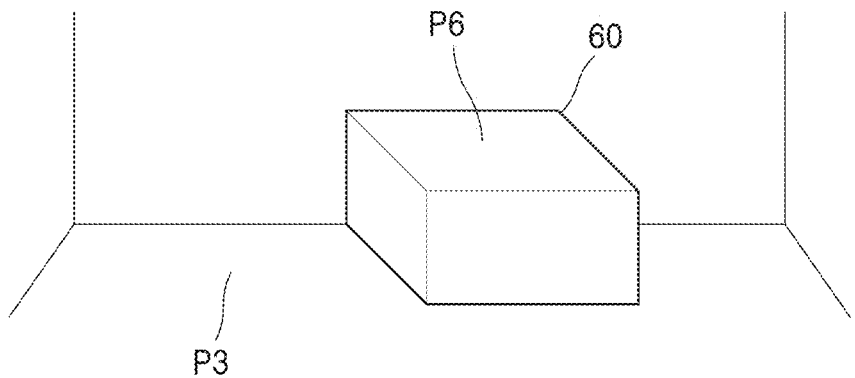
FIG. 6 is another diagram for describing a method, performed by the augmented reality providing apparatus of FIG. 2, of recognizing a plane.

FIG. 6 is another diagram for describing a method, performed by the AR providing apparatus 200 of FIG. 2, of recognizing a plane.

Referring to FIG. 6, an object 60 is placed on the third plane P3 recognized as the floor, and the AR providing apparatus 200 may recognize a top surface of the object 60 as a sixth plane P6. Attributes of the third plane P3 and the sixth plane P6 may all be the "floor". As such, when a plurality of planes having the same attribute are present, the AR providing apparatus 200 may provide an object moving between the plurality of planes and may apply an animation when the object moves. For example, a "jump" animation may be applied when an object is a character and the character moves between two planes (the third and sixth planes P3 and P6) having different heights.

The AR providing apparatus 200 may move an object according to the user's touch. When the user touches the sixth plane P6 when the object is moving on the third plane P3, the object moves to a touched point. At this time, because there is movement between planes on a moving path and height of the planes are different, the AR providing apparatus 200 applies a "jump" animation.

Figure 7:
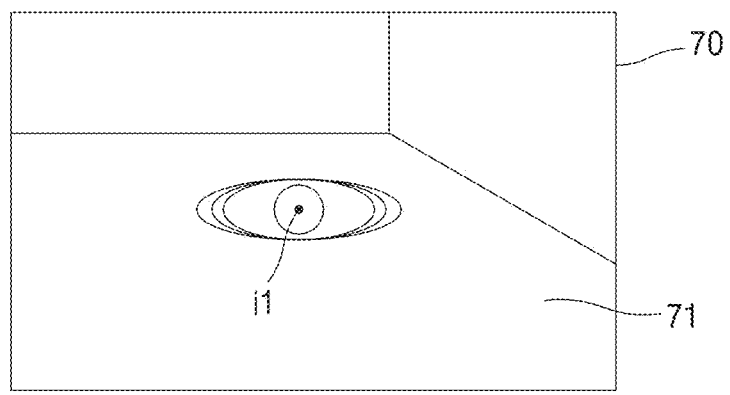
FIGS. 7 and 8 are examples of screens in which augmented reality is provided.
Figure 8:
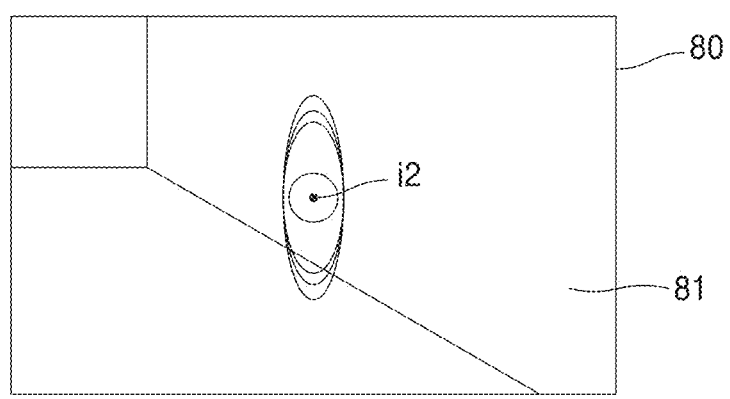

FIGS. 7 and 8 are examples of screens in which AR is provided.

Referring to FIG. 7, a screen captured by the camera 223 is displayed on a screen 70 and AR provided as an object i1 is overlapped and displayed on a plane 71. A parameter of the object i1 may include a color and inclination. The color of the object i1 may be a color corresponding to the "floor" that is an attribute of the plane 71, and the inclination of the object i1 may be set according to direction information of the plane 71. In FIG. 7, the object i1 is inclined and displayed in an oval shape according to a direction of the plane 71.

Referring to FIG. 8, a screen captured by the camera 223 is displayed on a screen 80, and AR provided as an object i2 is overlapped and displayed on a plane 81. A parameter of the object i2 may include a color and inclination. The color of the object i2 may be a color corresponding to the "wall" that is an attribute of the plane 81, and the inclination of the object i2 may be set according to direction information of the plane 81. In FIG. 8, the object i2 is inclined and displayed in an oval shape according to a direction of the plane 81.

Referring to FIGS. 8 and 9, the user may recognize an attribute of a plane where an object is displayed based on a color of the object and intuitively recognize a direction of the plane based on inclination of the object.

Figure 9A:
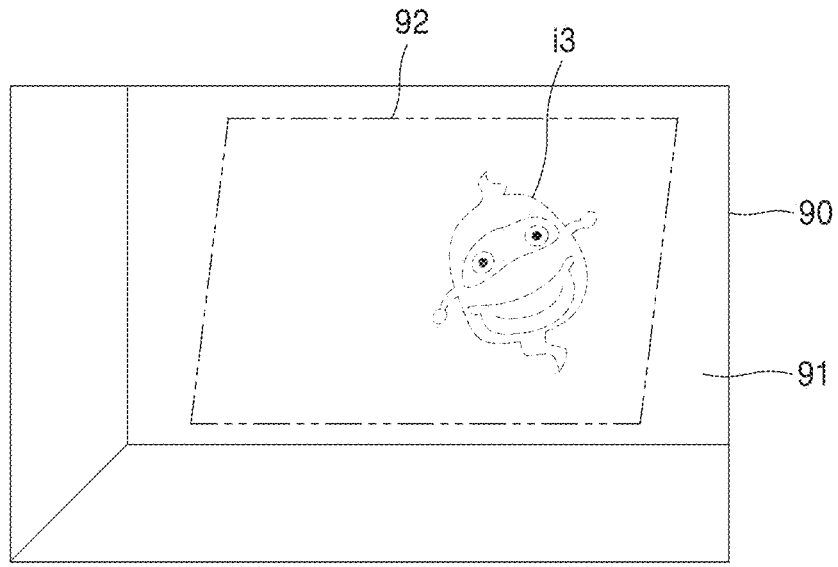
FIGS. 9A through 9C are other examples of a screen in which augmented reality is provided.
Figure 9B:
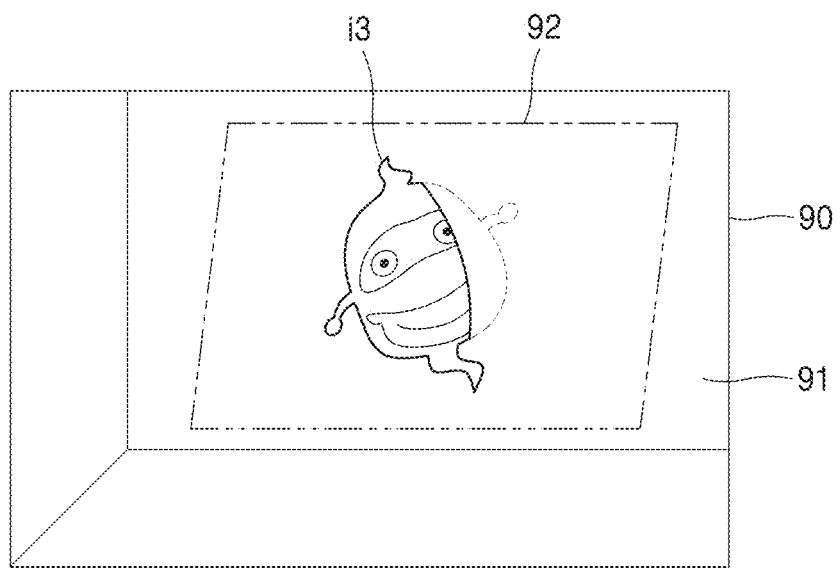
Figure 9C:
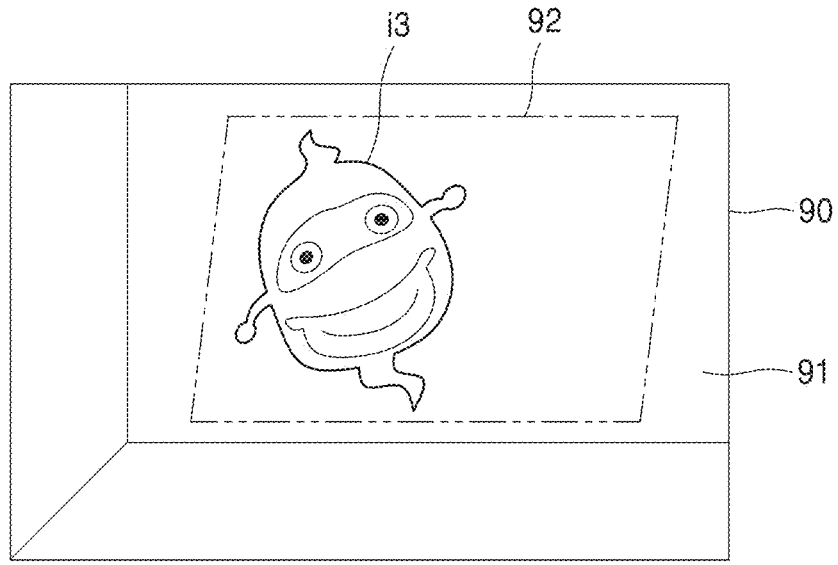

FIGS. 9A through 9C are other examples of a screen in which AR is provided.

Referring to FIGS. 9A through 9C, a screen captured by the camera 223 is displayed on a screen 90 and AR is provided as an object i3 is overlapped and displayed on a plane 91 recognized by the AR providing apparatus 200. A parameter of the object i3 may include character display information. Referring to FIGS. 9A through 9C, the AR providing apparatus 200 overlaps an opaque virtual layer 92 on the plane 91 and displays an animation as if the object i3 breaks through the plane 91 by displaying the object i3 to move in a normal vector direction of the plane 91, i.e., to move from the rear to the front of the virtual layer 92. The virtual layer 92 may be set to be displayed transparent with respect to the display other than the object i3. In other words, the virtual layer 92 may hide the display of the object i3 according to a position of the object i3, but is set not to hide the other display of the plane 91 or the like.

When the object i3 moves from the rear to the front of the virtual layer 92, a screen displayed on the user terminal 20 may sequentially change from FIG. 9A to 9B and from FIG. 9B to FIG. 9C. FIG. 9A illustrates an example in which the object i3 is present behind the virtual layer 92 and thus is not displayed on the screen 90. For convenience of description, the object i3 is displayed in a broken line in FIG. 9A, but the object i3 may not be visible on the screen 90 in reality. FIG. 9B illustrates a screen in which the object i3 is moving from the rear to the front and illustrates an example in which a part of the object i3 is displayed on the plane 91 and the remaining part is not displayed on the screen 90. For convenience of description, the object i3 is partially displayed in a broken line in FIG. 9B, but the part displayed in the broken line may not be visible on the screen 90 in reality. FIG. 9C illustrates an example in which the object i3 moved to the front of the virtual layer 92 and an entire view of the object i3 is overlapped and displayed on the plane 91.

Meanwhile, the object i3 may be a 3D object, and since the object i3 moves towards the user terminal 20 in the examples of FIGS. 9A through 9C, the AR providing apparatus 200 may gradually increase the size of the object i3 as the object i3 moves.

Figure 10:
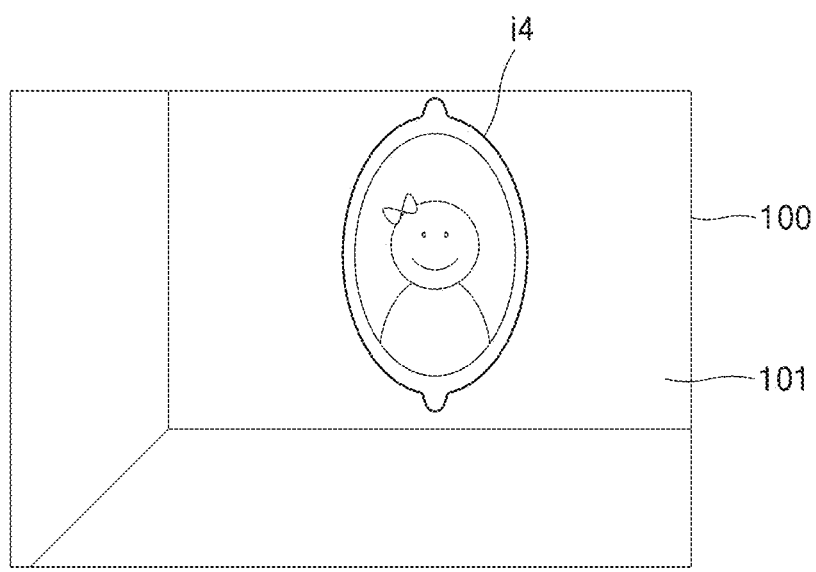
FIG. 10 is another example of a screen in which augmented reality is provided.

FIG. 10 is another example of a screen in which AR is provided.

Referring to FIG. 10, a screen captured by the camera 223 is displayed on a screen 100, and AR is provided as an object i4 is overlapped and displayed on a plane 101 recognized by the AR providing apparatus 200. Referring to FIG. 10, the AR providing apparatus 200 may display the object i4 of "mirror" on the plane 101 of which an attribute is assigned as the "wall". The AR providing apparatus 200 may indicate that the object i4 is a mirror by displaying a screen captured by a front camera (not shown) provided in the user terminal 20 in a pre-set internal region of the object i4.

Figure 11:
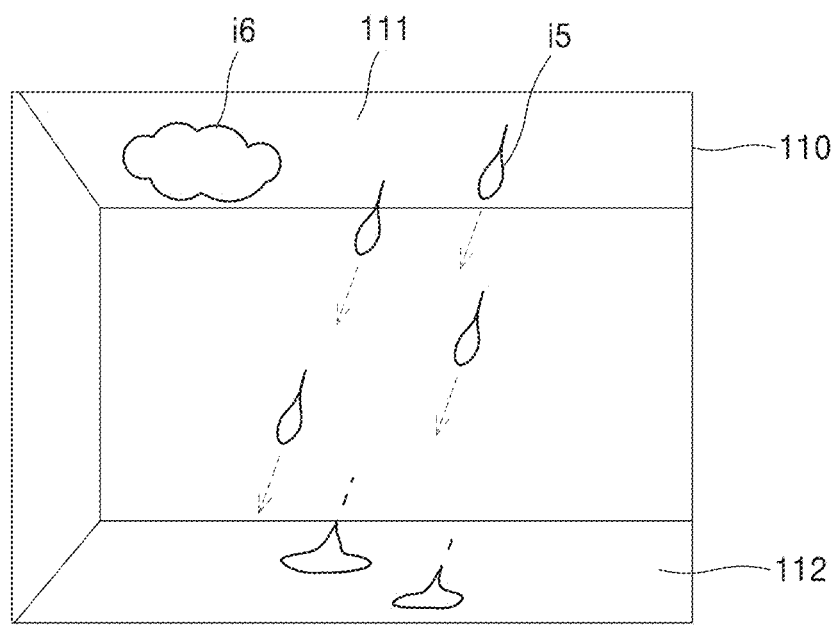
FIG. 11 is another example of a screen in which augmented reality is provided.

FIG. 11 is another example of a screen in which AR is provided.

Referring to FIG. 11, a screen captured by the camera 223 is displayed on a screen 110, and AR is provided as an object i5 is overlapped and displayed on the screen 110 according to information of planes 111 and 112 recognized by the AR providing apparatus 200. Referring to FIG. 11, the AR providing apparatus 200 may display the object i5 moving from the plane 111 of which an attribute is assigned as the "ceiling" to the plane 112 of which an attribute is assigned as the "floor". Arrows shown in FIG. 11 indicate paths in which a plurality of elements (raindrops) included in the object i5 are moving for convenience of description and are not displayed on the screen 110. Referring to FIG. 11, an animation in which elements of the object i5 move from the plane 111 to the plane 112, scatter in a same direction as the plane 112 when reaching the plane 112, and then disappear via fade-out, may be displayed to realize a display effect as if the raindrops are scattered on the floor.

Referring to FIG. 11, the AR providing apparatus 200 may further overlap and display an object i6 on the plane 111 of which the attribute is assigned as the "ceiling". As shown in FIG. 11, the AR providing apparatus 200 may display a plurality of objects together.

Meanwhile, according to at least one example embodiment, a virtual layer described above may be displayed on the plane 111, and the elements of the object i5 may be displayed to move from the rear to the front of the virtual layer corresponding to the plane 111. According to another embodiment, the elements of the object i5 may be displayed to move from the rear to the front of the object i6. The object i6 may be set to be opaque with respect to the object i5, and moreover, may be set to be opaque with respect to not only the object i5, but also other portions displayed on the screen 110, for example, the plane 111.

Meanwhile, the AR providing method according to at least one example embodiment of the present disclosure shown in FIG. 4 can be written as a computer-executable program and can be implemented in general-use digital computers that execute the program using a computer-readable recording medium.

The medium may continuously store a computer-executable program or may temporarily store the computer-executable program to be executed or downloaded. Also, the medium may be various recording means or storage means of single hardware or a combination of plurality of pieces of hardware, and is not limited to a medium directly accessing a computer program, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Also, other examples of the medium include recording media or storage media managed by an application store distributing applications, a website or server supplying or distributing other various types of software, and the like.

The present disclosure has been described mainly with reference to preferred embodiments thereof. While the present disclosure has been described with reference to the embodiments shown in the drawings, the embodiments are only examples, and it will be understood by one of ordinary skill in the art that the present disclosure may be embodied in a form modified within the scope that is not outside the essential features of the present disclosure and other equivalent embodiments are possible. Thus, the embodiments should be considered in a descriptive sense only and not for purposes of limitation. Therefore, the scope of the present disclosure is defined not by the detailed description but by the appended claims, and all differences within the scope will be construed as being included in the present disclosure.

The present disclosure is applicable to various fields capable of using AR. For example, the present disclosure is applicable to various fields, such as games, broadcasting, architectural designs, vehicles, interior designs, manufacturing process management, mobile solutions, and education.

While the present disclosure has been described with reference to exemplary embodiments, it will be understood by one of ordinary skill in the art that the present disclosure can be variously changed and modified without departing from the scope that is not outside the ideas and areas of the present disclosure defined by appended claims.

The invention claimed is:

1. A non-transitory computer-readable medium storing computer-executable program instructions that, when executed by a processor of a terminal, cause the processor to perform operations including,
   capturing an image by a camera of the terminal;
   obtaining plane information of a plane in the captured image;
   determining an attribute of the plane based on the plane information; and
   based on the determined attribute of the plane, displaying, on a display of the terminal, an object on the plane; and
   displaying at least a portion of the captured image in a pre-set internal region of the object.

2. The non-transitory computer-readable medium of claim 1, wherein the attribute of the plane includes a type of the plane.

3. The non-transitory computer-readable medium of claim 1, wherein the plane information is direction information of the plane based on a direction of the terminal.

4. The non-transitory computer-readable medium of claim 3, wherein the obtaining the plane information includes measuring the direction of the terminal by a direction sensor.

5. The non-transitory computer-readable medium of claim 1, wherein the displaying includes:
   obtaining a parameter of the object; and
   according to the parameter of the object, displaying the object on the plane.

6. The non-transitory computer-readable medium of claim 5, wherein the parameter comprises at least one of a size of the object, direction of the object, color of the object, or an animation applied to the object.

7. The non-transitory computer-readable medium of claim 1, wherein the displaying includes two-dimensionally rendering 3-dimensional (3D) information for displaying the object, according to a rendering direction, and two-dimensionally displaying the object.

8. The non-transitory computer-readable medium of claim 1, wherein the displaying includes overlapping the object and a video captured by the camera and displaying the video overlapped by the object.

9. An augmented reality providing method comprising:
   capturing an image by a camera of a terminal;
   obtaining plane information of a plane in the captured image;
   determining an attribute of the plane based on the plane information;

based on the determined attribute of the plane, displaying, on a display of the terminal, an object on the plane: and displaying at least a portion of the captured image in a pre-set internal region of the object.

10. The augmented reality providing method of claim 9, wherein the displaying includes:

obtaining a parameter of the object; and according to the parameter of the object, displaying the object on the plane.

11. The augmented reality providing method of claim 9, wherein the displaying includes two-dimensionally rendering 3-dimensional (3D) information for displaying the object, according to a rendering direction, and two-dimensionally displaying the object.

12. The augmented reality providing method of claim 9, wherein the displaying includes overlapping the object and a video captured by the camera and displaying the video overlapped by the object.

13. An augmented reality providing apparatus comprising:

a camera configured to capture an image; and processing circuitry configured to, obtain plane information of a plane in the captured image;

determine an attribute of the plane based on the plane information;

based on the determined attribute of the plane, display, on a display unit, an object on the plane; and display at least a portion of the captured image in a pre-set internal region of the object.

14. The augmented reality providing apparatus of claim 13, wherein the attribute of the plane includes a type of the plane.

15. The augmented reality providing apparatus of claim 13, wherein the plane information is direction information of the plane based on a direction of a terminal.

16. The augmented reality providing apparatus of claim 13, wherein the processing circuitry is configured to obtain a parameter of the object; and display the object on the plane according to the parameter of the object.

17. The augmented reality providing apparatus of claim 13, wherein the processing circuitry is configured to render 3-dimensional (3D) information two-dimensionally for displaying the object, according to a rendering direction, and two-dimensionally displaying the object.

18. The augmented reality providing apparatus of claim 14, wherein the processing circuitry is configured to overlap the object and a video captured by the camera and display the video overlapped by the object.

* * * * *